United States Patent
Cuff et al.

(10) Patent No.: US 9,198,054 B2
(45) Date of Patent: *Nov. 24, 2015

(54) AGGREGATE LOCATION DYNOMETER (ALD)

(71) Applicant: TeleCommunication Systems, Inc., Annapolis, MD (US)

(72) Inventors: Michael A. Cuff, Clyde Hill, WA (US); Todd Gehrke, Seattle, WA (US); Farhad Kasad, Bothell, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,691

(22) Filed: Feb. 10, 2014

(65) Prior Publication Data

US 2014/0155105 A1    Jun. 5, 2014

Related U.S. Application Data

(63) Continuation of application No. 13/317,996, filed on Nov. 2, 2011, now Pat. No. 8,649,806.

(60) Provisional application No. 61/573,112, filed on Sep. 2, 2011.

(51) Int. Cl.
    *H04W 24/00* (2009.01)
    *H04W 24/08* (2009.01)
    (Continued)

(52) U.S. Cl.
    CPC .............. *H04W 24/00* (2013.01); *H04W 4/023* (2013.01); *H04W 24/08* (2013.01); *H04W 64/006* (2013.01); *H04L 67/22* (2013.01); *H04W 4/22* (2013.01)

(58) Field of Classification Search
    CPC ....... H04W 64/006; H04W 4/22; H04W 4/02; H04W 4/028; H04W 76/007; H04W 4/023; H04W 24/00; H04W 4/025; H04W 24/08; H04W 64/00; H04L 67/22
    USPC ................ 455/404.1, 404.2, 456.1–457, 405, 455/456.6, 456.2, 456.3, 456.5, 435.1, 455/435.2
    See application file for complete search history.

(56) References Cited

U.S. PATENT DOCUMENTS

| 4,445,118 A | 4/1984 | Taylor |
| 4,928,107 A | 5/1990 | Kuroda |

(Continued)

OTHER PUBLICATIONS

International Search Report received in PCT/US2012/000374 dated Nov. 20, 2012.

(Continued)

*Primary Examiner* — Olumide T Ajibade Akonai
(74) *Attorney, Agent, or Firm* — William H. Bollman

(57) ABSTRACT

An Aggregate Location Dynometer (ALD) in a physical wireless network alerts to a problematic crowd risk using location based services (LBS). An Aggregate Location Dynometer (ALD) comprises a Network Monitor, a Crowd Risk Determinant and an Alert Module. The Network Monitor monitors wireless traffic for a potential viral event, associated with a formation of a plurality of wireless devices. The Crowd Risk Determinant requests location information associated with a plurality of wireless devices in a given area regarding a respective viral event. The Crowd Risk Determinant determines if the viral event also indicates a crowd safety risk, based on the shape and movement of observed wireless devices. The Alert Module triggers an alert of an impending crowd problem when crowd risk is above a given threshold. Historical databases are empirically determined and maintained in the Aggregate Location Dynometer (ALD) for use in viral event and crowd risk assessment.

14 Claims, 7 Drawing Sheets

(51) Int. Cl.
*H04W 64/00* (2009.01)
*H04W 4/02* (2009.01)
*H04L 29/08* (2006.01)
*H04W 4/22* (2009.01)

(56) References Cited

U.S. PATENT DOCUMENTS

| | | | |
|---|---|---|---|
| 4,972,484 A | 11/1990 | Theile |
| 5,126,722 A | 6/1992 | Kamis |
| 5,283,570 A | 2/1994 | Deluca |
| 5,301,354 A | 4/1994 | Schwendeman |
| 5,311,516 A | 5/1994 | Kuznicki |
| 5,327,529 A | 7/1994 | Fults |
| 5,335,246 A | 8/1994 | Yokev |
| 5,351,235 A | 9/1994 | Lahtinen |
| 5,365,451 A | 11/1994 | Wang |
| 5,418,537 A | 5/1995 | Bird |
| 5,422,813 A | 6/1995 | Schuchman |
| 5,479,408 A | 12/1995 | Will |
| 5,485,163 A | 1/1996 | Singer |
| 5,504,491 A | 4/1996 | Chapman |
| 5,506,886 A | 4/1996 | Maine |
| 5,517,199 A | 5/1996 | DiMattei |
| 5,530,655 A | 6/1996 | Lokhoff |
| 5,530,914 A | 6/1996 | McPheters |
| 5,539,395 A | 7/1996 | Buss |
| 5,539,829 A | 7/1996 | Lokhoff |
| 5,546,445 A | 8/1996 | Dennison |
| 5,568,153 A | 10/1996 | Beliveau |
| 5,583,774 A | 12/1996 | Diesel |
| 5,594,780 A | 1/1997 | Wiedeman |
| 5,606,618 A | 2/1997 | Lokhoff |
| 5,629,693 A | 5/1997 | Janky |
| 5,633,630 A | 5/1997 | Park |
| 5,636,276 A | 6/1997 | Brugger |
| 5,661,652 A | 8/1997 | Sprague |
| 5,661,755 A | 8/1997 | Van de Kerkhof |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,727,057 A | 3/1998 | Emery |
| 5,731,785 A | 3/1998 | Lemelson |
| 5,765,152 A | 6/1998 | Erickson |
| 5,771,353 A | 6/1998 | Eggleston |
| 5,774,670 A | 6/1998 | Montulli |
| 5,809,415 A | 9/1998 | Rossman |
| 5,812,086 A | 9/1998 | Bertiger |
| 5,812,087 A | 9/1998 | Krasner |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,922,074 A | 7/1999 | Richard |
| 5,930,250 A | 7/1999 | Klok |
| 5,945,944 A | 8/1999 | Krasner |
| 5,946,629 A | 8/1999 | Sawyer |
| 5,950,137 A | 9/1999 | Kim |
| 5,960,362 A | 9/1999 | Grob |
| 5,983,099 A | 11/1999 | Yao |
| 5,999,124 A | 12/1999 | Sheynblat |
| 6,032,051 A | 2/2000 | Hall |
| 6,049,718 A | 4/2000 | Stewart |
| 6,052,081 A | 4/2000 | Krasner |
| 6,058,338 A | 5/2000 | Agashe |
| 6,061,018 A | 5/2000 | Sheynblat |
| 6,064,336 A | 5/2000 | Krasner |
| 6,067,045 A | 5/2000 | Castelloe |
| 6,081,229 A | 6/2000 | Soliman |
| 6,085,320 A | 7/2000 | Kaliski, Jr. |
| 6,118,403 A | 9/2000 | Lang |
| 6,121,923 A | 9/2000 | King |
| 6,124,810 A | 9/2000 | Segal |
| 6,131,067 A | 10/2000 | Girerd |
| 6,133,874 A | 10/2000 | Krasner |
| 6,134,483 A | 10/2000 | Vayanos |
| 6,147,598 A | 11/2000 | Murphy |
| 6,150,980 A | 11/2000 | Krasner |
| 6,154,172 A | 11/2000 | Piccionelli |
| 6,169,901 B1 | 1/2001 | Boucher |
| 6,169,902 B1 | 1/2001 | Kawamoto |
| 6,178,506 B1 | 1/2001 | Quick, Jr. |
| 6,185,427 B1 | 2/2001 | Krasner |
| 6,188,354 B1 | 2/2001 | Soliman |
| 6,188,909 B1 | 2/2001 | Alanara |
| 6,189,098 B1 | 2/2001 | Kaliski, Jr. |
| 6,195,557 B1 | 2/2001 | Havinis |
| 6,204,798 B1 | 3/2001 | Fleming |
| 6,205,330 B1 | 3/2001 | Winbladh |
| 6,208,290 B1 | 3/2001 | Krasner |
| 6,215,441 B1 | 4/2001 | Moeglein |
| 6,239,742 B1 | 5/2001 | Krasner |
| 6,247,135 B1 | 6/2001 | Feague |
| 6,249,873 B1 | 6/2001 | Richard |
| 6,253,203 B1 | 6/2001 | O'Flaherty |
| 6,260,147 B1 | 7/2001 | Quick, Jr. |
| 6,275,692 B1 | 8/2001 | Skog |
| 6,275,849 B1 | 8/2001 | Ludwig |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,321,257 B1 | 11/2001 | Kotola |
| 6,324,542 B1 | 11/2001 | Lent |
| 6,327,473 B1 | 12/2001 | Soliman |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,430,504 B1 | 8/2002 | Gilbert |
| 6,433,734 B1 | 8/2002 | Krasner |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,525,687 B2 | 2/2003 | Roy |
| 6,525,688 B2 | 2/2003 | Chou |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | Fomukong |
| 6,560,534 B2 | 5/2003 | Abraham |
| 6,567,035 B1 | 5/2003 | Elliott |
| 6,570,530 B2 | 5/2003 | Gaal |
| 6,574,558 B2 | 6/2003 | Kohli |
| 6,580,390 B1 | 6/2003 | Hay |
| 6,584,552 B1 | 6/2003 | Kuno |
| 6,594,500 B2 | 7/2003 | Bender |
| 6,597,311 B2 | 7/2003 | Sheynblat |

(56) References Cited

U.S. PATENT DOCUMENTS

| | | | |
|---|---|---|---|
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockheart |
| 6,628,233 B2 | 9/2003 | Knockheart |
| 6,633,255 B2 | 10/2003 | Krasner |
| 6,640,184 B1 | 10/2003 | Rabe |
| 6,650,288 B1 | 11/2003 | Seitz |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockheart |
| 6,680,695 B2 | 1/2004 | Turetzky |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | van Diggelen |
| 6,704,651 B2 | 3/2004 | Van Diggelen |
| 6,707,421 B1 | 3/2004 | Drury |
| 6,714,793 B1 | 3/2004 | Carey |
| 6,721,871 B2 | 4/2004 | Piispanen |
| 6,724,342 B2 | 4/2004 | Bloebaum |
| 6,725,159 B2 | 4/2004 | Krasner |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,772,340 B1 | 8/2004 | Peinado |
| 6,775,655 B1 | 8/2004 | Peinado |
| 6,775,802 B2 | 8/2004 | Gaal |
| 6,778,136 B2 | 8/2004 | Gronomeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McCraw |
| 6,799,050 B1 | 9/2004 | Krasner |
| 6,801,124 B2 | 10/2004 | Naitou |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,269 B2 | 11/2004 | Kogan |
| 6,829,475 B1 | 12/2004 | Lee |
| 6,832,373 B2 | 12/2004 | O'Neill |
| 6,833,785 B2 | 12/2004 | Brown |
| 6,839,020 B2 | 1/2005 | Geier |
| 6,839,021 B2 | 1/2005 | Sheynblat |
| 6,842,715 B1 | 1/2005 | Gaal |
| 6,853,849 B1 | 2/2005 | Tognazzini |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,734 B2 | 3/2005 | Voor |
| 6,873,854 B2 | 3/2005 | Crockett |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,895,324 B2 | 5/2005 | Straub |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,956,467 B1 | 10/2005 | Mercado, Jr. |
| 6,957,073 B2 | 10/2005 | Bye |
| 6,961,562 B2 | 11/2005 | Ross |
| 6,965,754 B2 | 11/2005 | King |
| 6,965,767 B2 | 11/2005 | Maggenti |
| 6,970,917 B1 | 11/2005 | Kushwaha |
| 6,973,166 B1 | 12/2005 | Tsumpes |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohles |
| 6,985,105 B1 | 1/2006 | Seitz |
| 6,996,720 B1 | 2/2006 | DeMello |
| 6,998,985 B2 | 2/2006 | Reisman |
| 6,999,782 B2 | 2/2006 | Shaughnessy |
| 7,020,440 B2 * | 3/2006 | Watanabe et al. ......... 455/67.11 |
| 7,024,321 B1 | 4/2006 | Deniger |
| 7,024,393 B1 | 4/2006 | Peinado |
| 7,047,411 B1 | 5/2006 | DeMello |
| 7,064,656 B2 | 6/2006 | Bekcher |
| 7,065,351 B2 | 6/2006 | Carter |
| 7,065,507 B2 | 6/2006 | Mohammed |
| 7,071,814 B1 | 7/2006 | Schorman |
| 7,079,857 B2 | 7/2006 | Maggenti |
| 7,103,018 B1 | 9/2006 | Hasen |
| 7,103,574 B1 | 9/2006 | Peinado |
| 7,106,717 B2 | 9/2006 | Rosseau |
| 7,136,838 B1 | 11/2006 | Peinado |
| 7,151,946 B2 | 12/2006 | Magennti |
| 7,177,623 B2 | 2/2007 | Baldwin |
| 7,203,752 B2 | 4/2007 | Rice |
| 7,209,969 B2 | 4/2007 | Lahti |
| 7,218,940 B2 | 5/2007 | Niemenna |
| 7,221,959 B2 | 5/2007 | Lindqvist |
| 7,269,413 B2 | 9/2007 | Kraft |
| 7,301,494 B2 | 11/2007 | Waters |
| 7,324,823 B1 | 1/2008 | Rosen |
| RE42,927 E | 11/2011 | Want |
| 8,190,169 B2 | 5/2012 | Shim |
| 8,314,683 B2 | 11/2012 | Pfeffer |
| 8,442,807 B2 | 5/2013 | Ramachandran |
| 2001/0011247 A1 | 8/2001 | O'Flaherty |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0102999 A1 | 8/2002 | Maggenti |
| 2002/0112047 A1 | 8/2002 | Kushwaha |
| 2002/0135504 A1 | 9/2002 | Singer |
| 2002/0173317 A1 | 11/2002 | Nykanen |
| 2002/0198632 A1 | 12/2002 | Breed |
| 2003/0009602 A1 | 1/2003 | Jacobs |
| 2003/0037163 A1 | 2/2003 | Kitada |
| 2003/0065788 A1 | 4/2003 | Salomaki |
| 2003/0078064 A1 | 4/2003 | Chan |
| 2003/0081557 A1 | 5/2003 | Mettala |
| 2003/0101329 A1 | 5/2003 | Lahti |

(56) References Cited

U.S. PATENT DOCUMENTS

| | | |
|---|---|---|
| 2003/0101341 A1 | 5/2003 | Kettler |
| 2003/0103484 A1 | 6/2003 | Oommen |
| 2003/0112941 A1 | 6/2003 | Brown |
| 2003/0114157 A1 | 6/2003 | Spitz |
| 2003/0119528 A1 | 6/2003 | Pew |
| 2003/0131023 A1 | 7/2003 | Bassett |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0204640 A1 | 10/2003 | Sahinoja |
| 2003/0223381 A1 | 12/2003 | Schroderus |
| 2004/0002326 A1 | 1/2004 | Maher |
| 2004/0044623 A1 | 3/2004 | Wake |
| 2004/0046667 A1 | 3/2004 | Copley |
| 2004/0064550 A1 | 4/2004 | Sakata |
| 2004/0068724 A1 | 4/2004 | Gardner |
| 2004/0090121 A1 | 5/2004 | Simonds |
| 2004/0204806 A1 | 10/2004 | Chen |
| 2004/0205151 A1 | 10/2004 | Sprigg |
| 2004/0229632 A1 | 11/2004 | Flynn |
| 2004/0257273 A1 | 12/2004 | Benco |
| 2005/0003797 A1 | 1/2005 | Baldwin |
| 2005/0028034 A1 | 2/2005 | Gantman |
| 2005/0039178 A1 | 2/2005 | Marolia |
| 2005/0041578 A1 | 2/2005 | Huotari |
| 2005/0086340 A1 | 4/2005 | Kang |
| 2005/0086467 A1 | 4/2005 | Asokan |
| 2005/0112030 A1 | 5/2005 | Gauss |
| 2005/0136895 A1 | 6/2005 | Thenthiruperai |
| 2005/0170856 A1 | 8/2005 | Keyani |
| 2005/0172217 A1 | 8/2005 | Leung |
| 2005/0174987 A1 | 8/2005 | Raghav |
| 2005/0209995 A1 | 9/2005 | Aksu |
| 2005/0233735 A1 | 10/2005 | Karaoguz |
| 2005/0246217 A1 | 11/2005 | Horn |
| 2005/0259675 A1 | 11/2005 | Tuohino |
| 2006/0053225 A1 | 3/2006 | Poikselka |
| 2006/0058045 A1 | 3/2006 | Nilsen |
| 2006/0073810 A1 | 4/2006 | Pyhalammi |
| 2006/0074618 A1 | 4/2006 | Miller |
| 2006/0090136 A1 | 4/2006 | Miller |
| 2006/0097866 A1 | 5/2006 | Adamczyk |
| 2006/0212558 A1 | 9/2006 | Sahinoja |
| 2006/0212562 A1 | 9/2006 | Kushwaha |
| 2006/0234639 A1 | 10/2006 | Kushwaha |
| 2006/0234698 A1 | 10/2006 | Folk |
| 2006/0246920 A1 | 11/2006 | Shim |
| 2007/0026854 A1 | 2/2007 | Nath |
| 2007/0030116 A1 | 2/2007 | Feher |
| 2007/0030539 A1 | 2/2007 | Nath |
| 2007/0030973 A1 | 2/2007 | Mikan |
| 2007/0049287 A1 | 3/2007 | Dunn |
| 2007/0186105 A1 | 8/2007 | Bailey |
| 2007/0191025 A1 | 8/2007 | McBrierty |
| 2007/0271596 A1 | 11/2007 | Boubion |
| 2008/0026723 A1 | 1/2008 | Han |
| 2008/0160980 A1 | 7/2008 | Harris |
| 2008/0198989 A1 | 8/2008 | Contractor |
| 2008/0318591 A1 | 12/2008 | Oliver |
| 2009/0058830 A1 | 3/2009 | Herz |
| 2009/0140851 A1 | 6/2009 | Graves |
| 2009/0204815 A1 | 8/2009 | Dennis |
| 2009/0222388 A1 | 9/2009 | Hua |
| 2009/0271486 A1 | 10/2009 | Ligh |
| 2009/0311992 A1 | 12/2009 | Jagetiya |
| 2009/0328135 A1 | 12/2009 | Szabo |
| 2010/0024045 A1 | 1/2010 | Sastry |
| 2010/0050251 A1 | 2/2010 | Speyer |
| 2010/0197318 A1* | 8/2010 | Petersen et al. ............ 455/456.1 |
| 2010/0205542 A1 | 8/2010 | Walman |
| 2010/0285763 A1 | 11/2010 | Ingrassia |
| 2010/0285814 A1 | 11/2010 | Price |
| 2010/0308993 A1 | 12/2010 | Ma |

OTHER PUBLICATIONS

International Preliminary Report on Patentability received in PCT/US2012/00374 dated Sep. 5, 2013.
Internal Search Report received in PCT/US2009/ 05575 dated Jan. 14, 2011.
Internal Search Report received in PCT/US2009/05575 dated Dec. 3, 2009.
International Search Report received in PCT/US2011/01198 dated Aug. 6, 2012.
Internal Search Report received in PCT/US2011/000671 dated Jul. 27, 2011.
Internal Search Report received in PCT/US2011/000671 dated Apr. 25, 2012.
International Search Report in PCT/US2010/001134 dated Oct. 31, 2011.
Internal Search Report received in PCT/US2011/00950 dated Sep. 16, 2011.
International Search Report in PCT/US2011/00950 dated Apr. 30, 2012.

* cited by examiner

AGGREGATE LOCATION DYNOMETER (ALD)

The present application is a continuation of U.S. application Ser. No. 13/317,996 entitled "Aggregate Location Dynometer (ALD)", filed on Nov. 2, 2011, now U.S. Pat. No. 8,649,806; which claims priority from U.S. Provisional Application No. 61/573,112, entitled "Aggregate Location Dynometer (ALD)", filed Sep. 2, 2011, the entirety of both of which are expressly incorporated herein by reference.

BACKGROUND OF THE INVENTION

1. Field of the Invention

This invention relates generally to wireless telecommunications. More particularly, it relates to cell location services, cell network trafficking and analysis of location information.

2. Background of Related Art

Location based applications obtain a geographic position of a particular wireless device and provide services accordingly. Location based services (LBS) prevail in today's market due to an incorporation of tracking technology in handheld devices.

Location based pull services allow a wireless device user to locate another wireless device. Current location services are generally focused on individual wireless device user applications.

SUMMARY OF THE INVENTION

In accordance with the principles of the present invention, a method of alerting to a problematic crowd risk in a given geographical location, comprises an Aggregate Location Dynometer (ALD). The Aggregate Location Dynometer (ALD) utilizes location based services (LBS) to analyze aggregate location information pertaining to a multitude of wireless devices, to detect potential crowd risks.

An Aggregate Location Dynometer (ALD) resides in a physical network server, in accordance with the present invention, and comprises three main components: a Network Monitor, a Crowd Risk Determinant, and an Alert Module.

The Network Monitor monitors a wireless network for indication of a possible impending viral event, in accordance with the principles of the present invention. In particular, the Network Monitor utilizes location based services (LBS) to monitor the formation of a plurality of wireless devices at a given point in a wireless network, e.g., a given base station (BS). The Network Monitor compares obtained traffic parameters pertaining to monitored wireless traffic, with historical traffic parameters having to do with crowd risk determination, to determine if a viral event may be occurring or impending. A snapshot look at current location data collected by the Network Monitor is subsequently logged in an appropriate historical database.

In accordance with the principles of the present invention, the Crowd Risk Determinant analyzes location information to determine if a viral event triggered by the Network Monitor, also indicates a crowd safety risk. In particular, the Crowd Risk Determinant initiates a location request to obtain location information pertaining to a multitude of wireless devices in a given area, regarding a viral event that has been triggered by the Network Monitor. The Crowd Risk Determinant compares the viral pattern formed by the shape and movement of wireless devices in locations observed, with predetermined risk rules to determine if the viral event is also a crowd safety risk. The observed viral pattern is subsequently logged in an appropriate historical database.

The Alert Module, in accordance with the principles of the present invention, alerts proper authorities in an event of a crowd safety risk. The Crowd Risk Determinant triggers the Alert Module to alert of an impending crowd problem when crowd risk has exceeded a given threshold.

The Aggregate Location Dynometer (ALD) utilizes historical databases, in accordance with the present invention, to maintain location-based information indicating possible viral events associated with a plurality of wireless devices. Historical databases include an Acceptable/Non-Acceptable Crowd Shape database, a Configurable Parameter Threshold database, a Historical Wireless Device Location Trends database, and a Risk Rules database.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Thus far, location capabilities have been concerned with locating an individual wireless device. Yet, there is such a vast abundance of individuals populating the nation's major cities. The present inventor has appreciated the benefits of using location based services (LBS) to obtain sets of aggregate location data corresponding to a number and pattern of wireless devices within an area, region, city, etc. of interest.

The present invention introduces an Aggregate Location Dynometer (ALD), an analytical server utilizing location based services (LBS) on a network to predict public safety risks, e.g., the unexpected impending formation of a flash mob, or a riot, etc.

The Aggregate Location Dynometer (ALD) analyzes a bird's-eye view of people formation, presuming those individuals possess respective handheld wireless devices that permit collection of current location information, whether that current location information be obtained from the wireless devices themselves, and/or from a network-based location server.

In accordance with the principles of the present invention, the Aggregate Location Dynometer (ALD) predicts public safety risk in a given geographical area through evaluation of the positioning and movement of wireless devices. The Aggregate Location Dynometer (ALD) monitors wireless device network traffic to predict an impending viral event. If a possible impending viral event is sensed from a general monitoring of wireless traffic, the Aggregate Location Dynometer (ALD) may request impending viral location information pertaining to clusters of wireless devices in a vicinity of the possible event, to more accurately assess crowd risk.

Crowd risk is assessed based upon given wireless network traffic parameters such as the number of wireless devices in communication with a given base station (e.g., a density), the shape formed by representations of the individual locations of the densest areas where active wireless devices are currently located, and/or the movement of the wireless devices within the region as defined.

Markers, each representing a wireless device at a given location at a given time, may be displayed on a display of the Aggregate Location Dynometer (ALD). The markers may represent wireless devices served within the given region, whether actively communicating with another wireless device, or merely sensed as present.

The present invention preferably provides an alert of a possible impending crowd related public safety risk in real time, as the crowd risk arises, informing emergency personnel as early as possible, even before such event is consummated.

Figure 1:
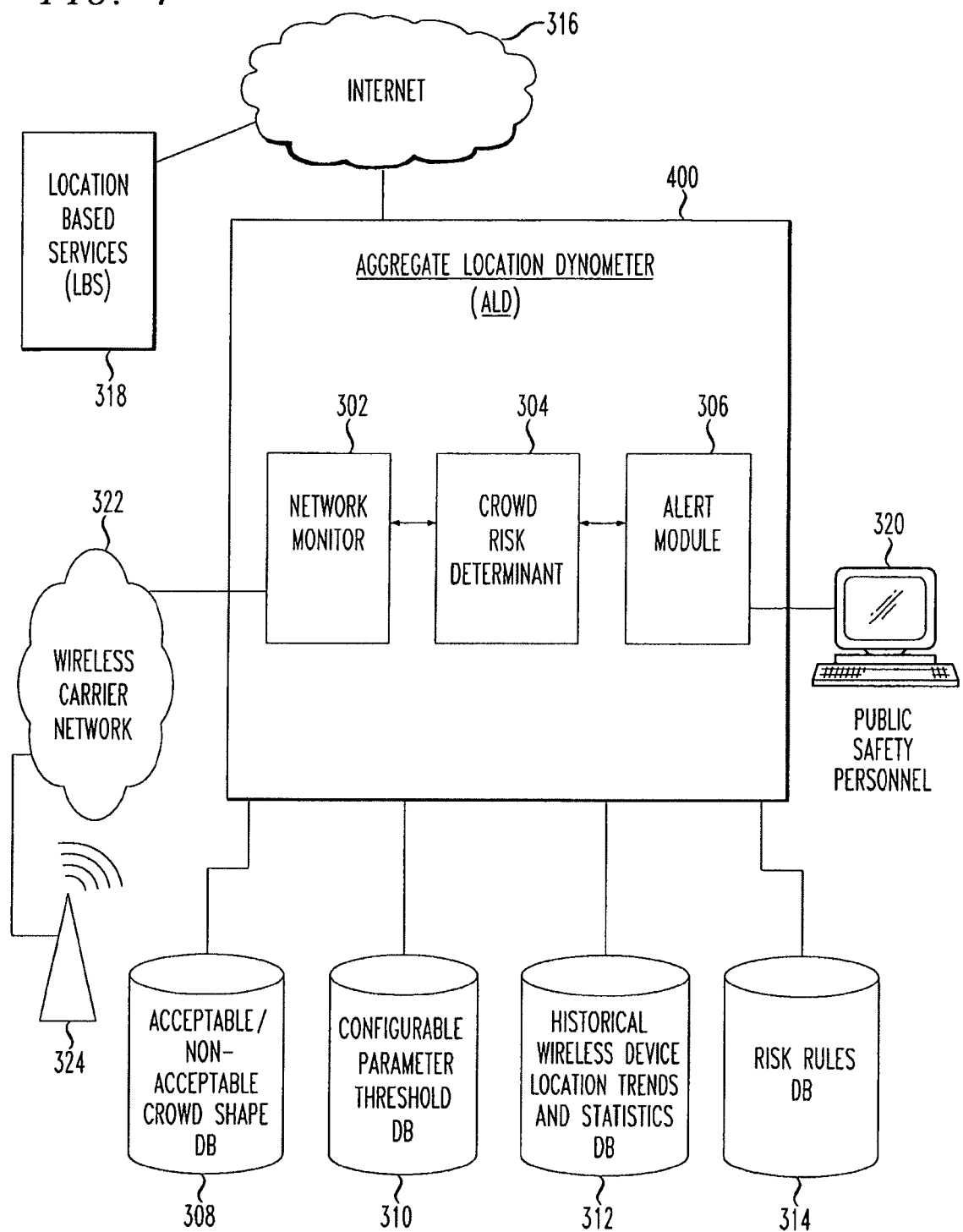
FIG. 1 depicts an exemplary Aggregate Location Dynometer (ALD), in accordance with the principles of the present invention.

FIG. 1 depicts an exemplary Aggregate Location Dynometer (ALD) 400, in accordance with the principles of the present invention.

In particular, an Aggregate Location Dynometer (ALD) 400 determines crowd safety risk with the help of location based services (LBS) 318, as depicted in FIG. 1.

The Aggregate Location Dynometer (ALD) 400 is generally based in a server in a wireless network 322. Three main components form the Aggregate Location Dynometer (ALD) 400: a Network Monitor 302, a Crowd Risk Determinant 304, and an Alert Module 306.

The Network Monitor 302 begins the risk determination process of the Aggregate Location Dynometer (ALD) 400 by monitoring the network for indication of a possible viral event, in accordance with the principles of the present invention. Determination of a viral event is the first step in the escalation-based response of the Aggregate Location Dynometer (ALD) 400.

The Crowd Risk Determinant 304 assesses location information pertaining to a possible viral event triggered by the Network Monitor 302. The Crowd Risk Determinant 304 determines if a viral event also indicates a public safety risk.

The Alert Module 306 performs predetermined responsive measures to alert appropriate public safety personnel 320 in the event of a possible or probable or current public safety risk.

Historical databases are empirically determined and maintained in the Aggregate Location Dynometer (ALD) 400 for use in crowd risk assessment. The historical databases preferably store sets of aggregate current location information pertaining to trackable wireless devices. Exemplary historical databases accessible by the Aggregate Location Dynometer (ALD) 400 include but are not limited to a Historical Wireless Device Location Trends and Statistics database 312, a Configurable Parameter Threshold database 310, a Risk Rules database 314, and an Acceptable/Non-Acceptable Crowd Shape database 308.

The Historical Wireless Device Location Trends and Statistics database 312, as shown in FIG. 1, preferably stores sets of instantaneous aggregate location information obtained over a period of time. Data stored in the Historical Wireless Device Location Trends and Statistics database 312 provides empirical evaluation of crowd activities used to detect a crowd trend. The Aggregate Location Dynometer (ALD) 400 preferably uses data stored in the Historical Wireless Device Location Trends and Statistics database 312 to determine if a current situation is considered to be 'normal' to the monitored area, or abnormal, triggering a viral event. The data maintained in the Historical Wireless Device Location Trends and Statistics database 312 is preferably refreshed over time.

The Configurable Parameter Threshold database 310, as depicted in FIG. 1, preferably comprises a set of configurable location-based parameters and thresholds including density, clustering, spread, geographical boundary, motion trends, and/or special events occurring in particular areas. The Configurable Parameter Threshold database 310 can also include non-location based parameters such as time of day and/or message content. The parameters stored in the Configurable Parameter Threshold database 310 are accessed by the Network Monitor 302 to assist in detecting a viral event.

The Risk Rules database 314, as shown in FIG. 1, preferably comprises a set of configurable location-based parameters and thresholds including density, clustering, spread, geographical boundary, motion trends, and/or special events occurring in particular areas. The Risk Rules database 314 can also include non-location based parameters such as time of day and/or message content. The parameters stored in the Risk Rules database 314 are accessed by the Crowd Risk Determinant 304 to assist in determining if a viral event also indicates a public safety risk.

The Acceptable/Non-Acceptable Crowd Shape database 308, as shown in FIG. 1, holds empirically determined past, historical cluster information regarding acceptable and/or non-acceptable past shape formations of clustered wireless devices. Specific shape parameters stored in the Acceptable/Non-Acceptable Crowd Shape database 308 are accessed by the Crowd Risk Determinant 304 to assist in determining if a viral event also indicates a public safety risk.

A viral event is the first state of alarm in the multi-state risk determination process of the Aggregate Location Dynometer (ALD) 400. A viral event is defined as occurring when one or more predefined parameter thresholds have been surpassed, as determined in the exemplary embodiment in the Network Monitor 302. The occurrence of a viral event does not necessarily infer a definite public safety risk. Instead, a viral event triggers the Crowd Risk Determinant 304 to further analyze a potentially malignant event more closely. For example, the Crowd Risk Determinant 304 provides a closer inspection of aggregate current location information, e.g., via use of a location-based push/pull service. A match of more detailed location information to a historical pattern leading to crowd risk may determine that a particular viral event also indicates a likely public safety risk.

A public safety risk confirms a compromise in crowd safety, e.g., the impending formation of a flash mob, or a riot, etc. Determination of a public safety risk triggers the Alert Module 306 to implement proper public safety response services.

The Network Monitor 302 begins the risk determination process of the Aggregate Location Dynometer (ALD) 400, by monitoring the network for indication of a possible viral event, in accordance with the principles of the present invention.

Moreover, the Network Monitor 302 retrieves subsequent sets of instantaneous aggregate location information. Location information triggered by the Network Monitor 302 may be portrayed in the form of snapshots displayed on a display of the Aggregate Location Dynometer (ALD) 400. Snapshots by the Network Monitor 302 comprise markers, each representing the location of individual wireless devices within a given region being monitored.

The Network Monitor 302 preferably obtains information regarding the number of wireless devices in a geographical area, at a given time, supported by a particular wireless network carrier (e.g., the number of wireless devices sending messages over a wireless network via a particular base station (BS) 324). The Network Monitor 302 uses predefined parameters and thresholds to determine if the monitored network indicates that a viral event may be occurring or impending (e.g., surpassed parameter thresholds possibly indicative of an excessive number and/or use of wireless devices for a given area, cell tower, etc.).

For instance, a Maximum Number of Devices parameter may indicate the maximum number of wireless devices that may be present within range of a particular base station (BS) 324 at a given time before a possible viral event is triggered. The Maximum Number of Devices parameter may be set manually, or empirically determined (e.g., the average number of devices present at a particular base station (BS) 324 over a course of time, as determined by historical data stored in the Historical Wireless Device Location Trends and Statistics database 312).

The Network Monitor 302 triggers a possible viral event if a predefined parameter threshold has been surpassed (e.g., a given density of current location markers each representing a separate wireless device, or a directed convergence of at least two highly dense clusters of markers toward each other at a significant rate of speed is or has occurred, etc.).

The Network Monitor 302 preferably tallies the number of wireless devices in each instantaneous aggregate location snapshot that is captured. Predetermined parameters and thresholds are used to assess the number (e.g., the density) of wireless devices in a particular area to determine whether or not a possible viral event is occurring.

The Maximum Number of Devices parameter may alternatively be set to indicate the maximum number of wireless devices that may be present in an instantaneous aggregate location snapshot before a possible viral event is triggered. If the number of devices present in a given snapshot exceeds the Maximum Value of Devices parameter established for the respective location, a viral event may be triggered.

The Network Monitor 302 also preferably tallies the difference in the number of wireless devices in a given area, from one consecutive instantaneous aggregate location snapshot to the next. If the difference in the number of wireless devices from snapshot to snapshot exceeds a predefined value in a number of consecutive snapshots for a given area, base station, etc., then a viral event may be triggered. Thresholds for such a predefined Maximum Difference in Number of Wireless Devices parameter and a predefined Interval of Consecutive Snapshots parameter may be set manually, or empirically determined (e.g., the average difference in number of devices in consecutive instantaneous aggregate location snapshots capturing a particular area, e.g., a number of square feet, a particular base station (BS), etc., over a course of time, supported by a particular network carrier, as recorded in the Historical Wireless Device Location Trends and Statistics database 312).

Figure 2:
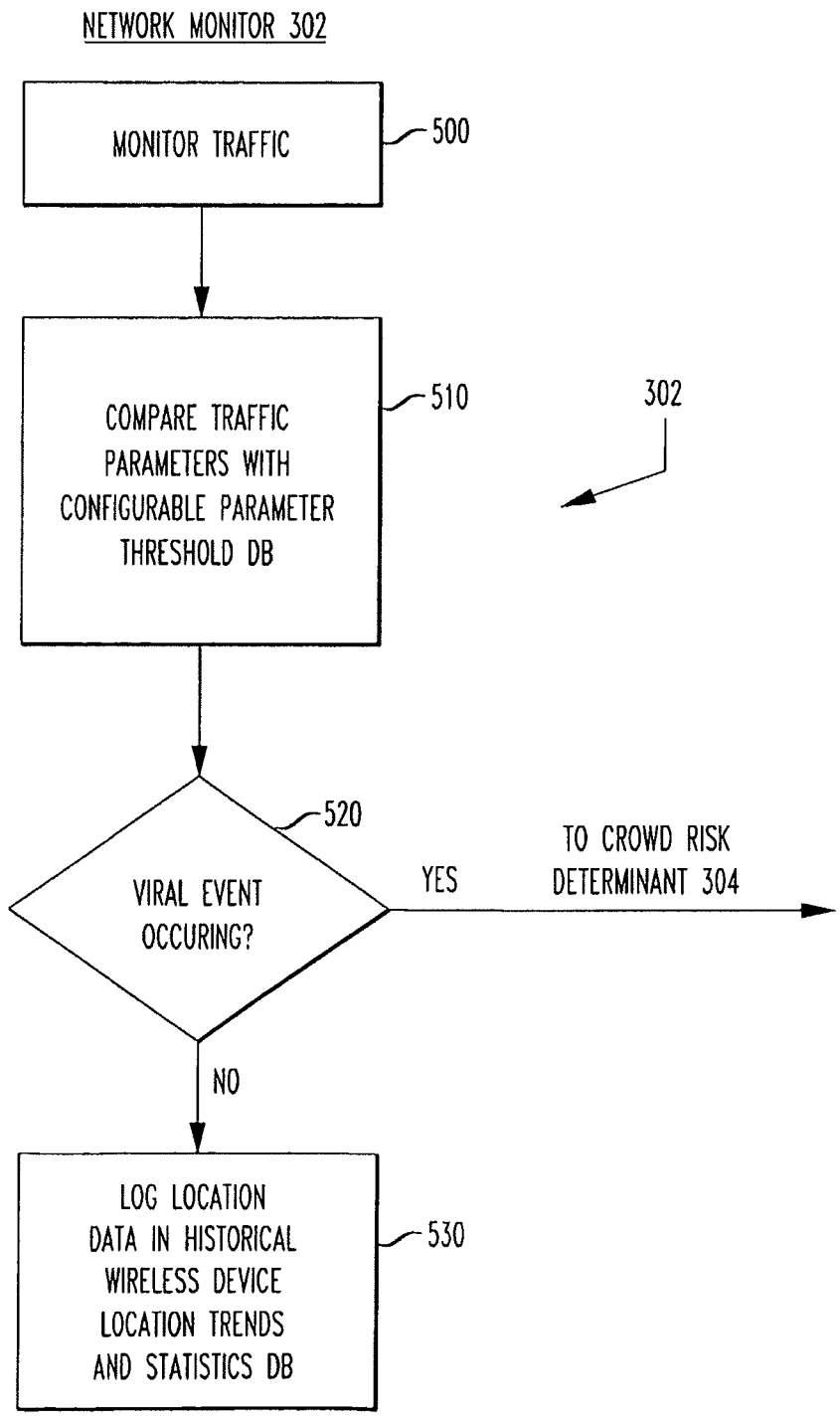
FIG. 2 depicts the flow of an exemplary Network Monitor of the Aggregate Location Dynometer (ALD), in accordance with the principles of the present invention.

FIG. 2 depicts the flow of an exemplary Network Monitor 302 of the Aggregate Location Dynometer (ALD) 400, in accordance with the principles of the present invention.

In particular, as shown in step 500 of FIG. 2, the Network Monitor 302 preferably continuously, or at least periodically or intermittently, monitors network traffic.

In step 510, monitored wireless data traffic is inspected for the presence of abnormal events, e.g., excessive volume for the time of day, etc. Configurable thresholds for the monitored parameters may be dynamic over the course of the day and even for traffic for any given tower or base station. The configurable thresholds for monitored parameters may be stored in the Configurable Parameter Threshold database 310.

As shown in step 520, if one or more parameter thresholds are exceeded, a viral event may be triggered. In response, the Network Monitor 302 triggers the Crowd Risk Determinant 304 to perform a location-based push/pull service to determine the location of each trackable wireless device within a particular geographic area (e.g., communicating through given base stations or antennas).

When parameter thresholds are not surpassed, indicating that a viral event is not occurring, location data may be logged in the Historical Wireless Device Location Trends and Statistics database 312, as depicted in step 530. Location data logged in the Historical Wireless Device Location Trends and Statistics database 312 may be used by the Crowd Risk Determinant 304 for future analyses of crowd risk.

Figure 3:
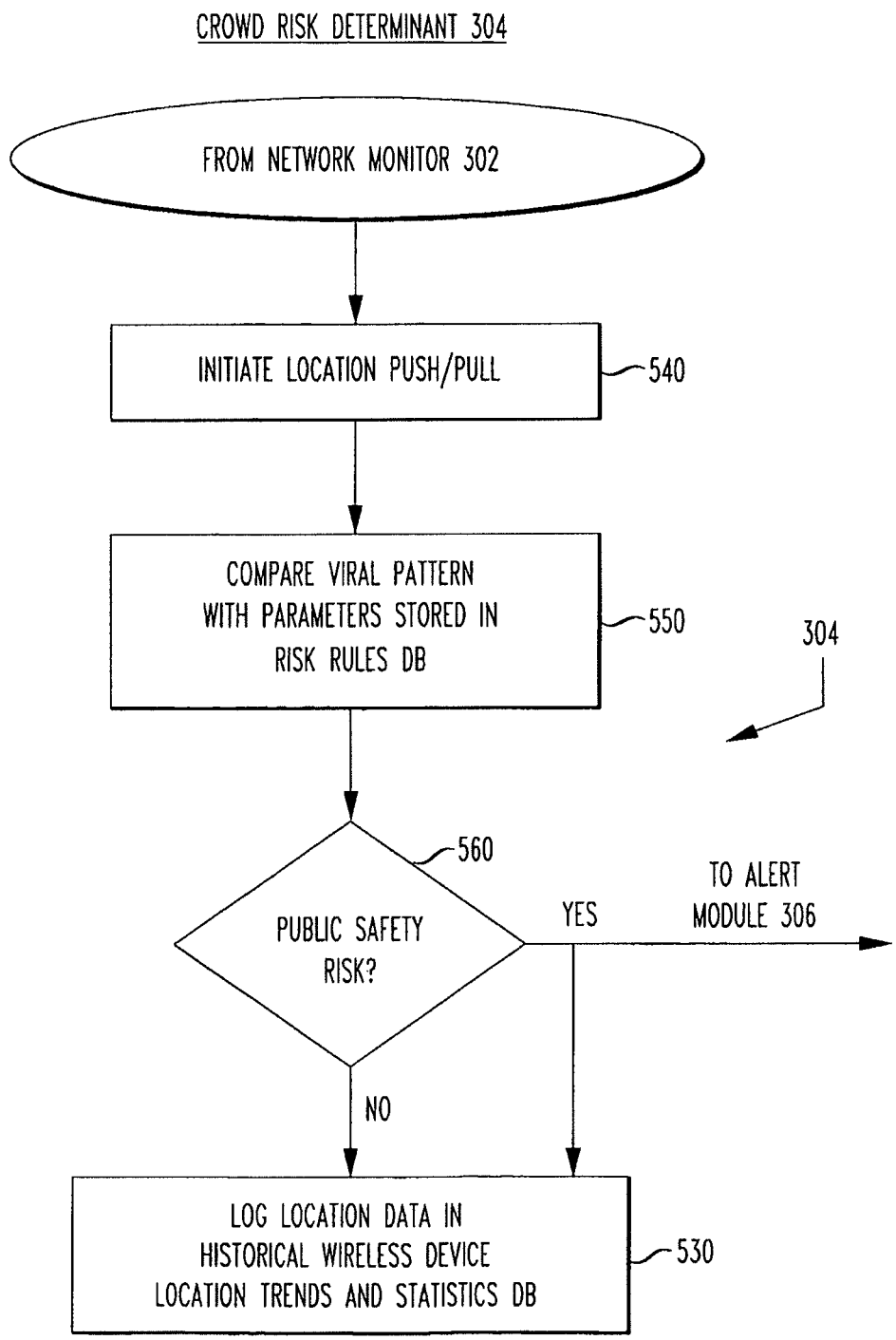
FIG. 3 depicts the flow of an exemplary Crowd Risk Determinant of the Aggregate Location Dynometer (ALD), in accordance with the principles of the present invention.

FIG. 3 depicts the flow of an exemplary Crowd Risk Determinant 304 of the Aggregate Location Dynometer (ALD) 400, in accordance with the principles of the present invention.

In particular, the Crowd Risk Determinant 304 performs a location-based push/pull service to obtain location information pertaining to trackable wireless devices in a given area regarding a respective viral event triggered by the Network Monitor 302, as shown in step 540 of FIG. 3.

In step 550, collected location data is analyzed to assess the viral event that is occurring. The Crowd Risk Determinant 304 uses bounds and priorities set forth in the Risk Rules database 314 to determine if a possible viral event indicates a public safety risk. A viral pattern may or may not imply public safety risk. In step 560, if a public safety risk is determined, the Crowd Risk Determinant 304 triggers the Alert Module 306 to take responsive public safety measures. Location data associated with a public safety risk is logged 530 in the Historical Wireless Device Location Trends and Statistics database 312.

If the Crowd Risk Determinant 304 confirms that a particular viral event does not indicate a public safety risk, the Aggregate Location Dynometer (ALD) 400 is triggered to routinely log location data 530 in the Historical Wireless Device Location Trends and Statistics database 312 for potential future analyses.

Determination of a public safety risk in the Crowd Risk Determinant 304 triggers the Alert Module 306 to implement proper public safety response services. An Alert Module 306 is the final step in the risk determination process of the Aggregate Location Dynometer (ALD) 400.

Figure 4:
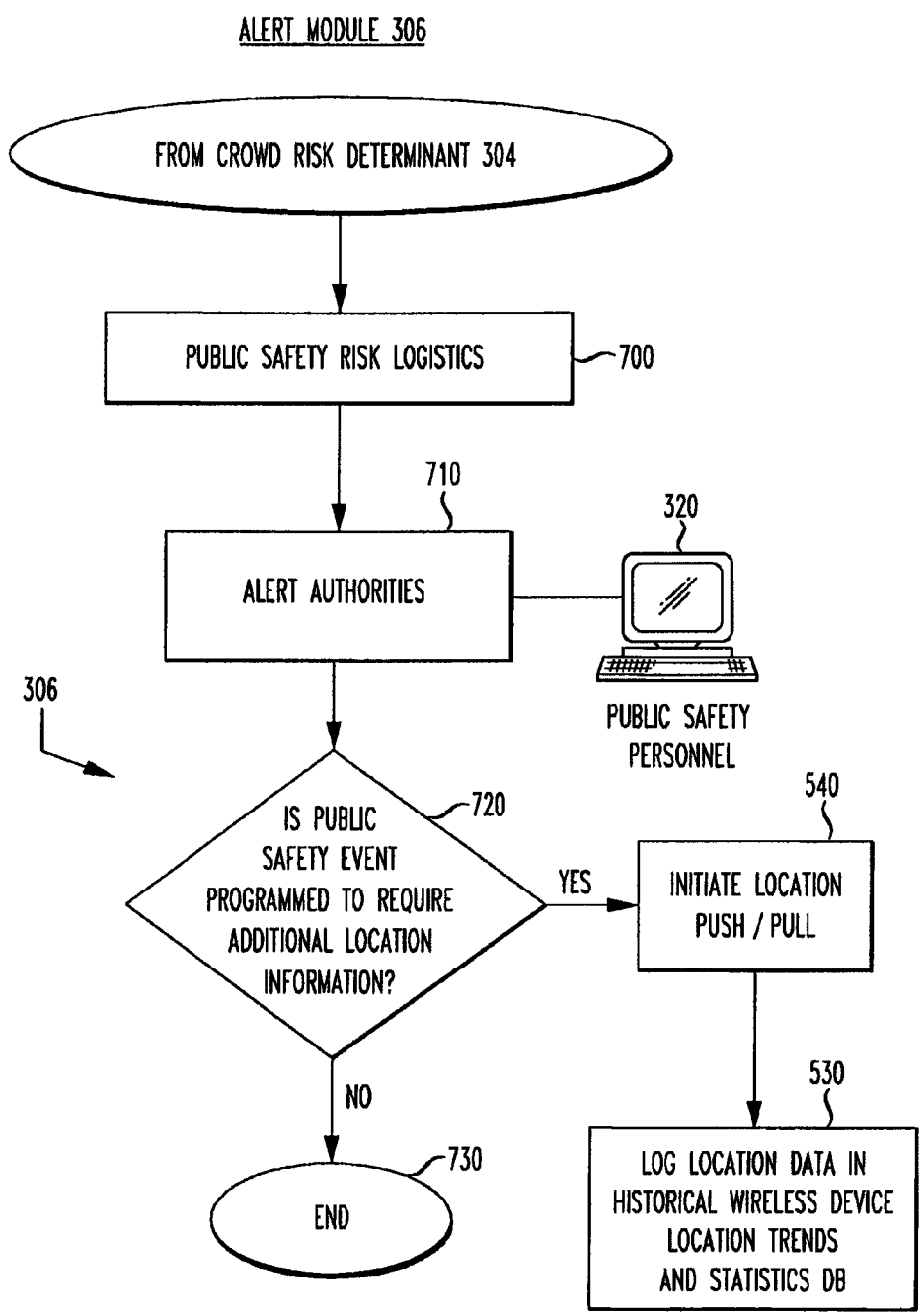
FIG. 4 depicts the flow of an exemplary Alert Module of the Aggregate Location Dynometer (ALD), in accordance with the principles of the present invention.

FIG. 4 depicts the flow of an exemplary Alert Module 306 of the Aggregate Location Dynometer (ALD) 400, in accordance with the principles of the present invention.

In particular, as shown in step 700 of FIG. 4, the Alert Module 306 is triggered by the Crowd Risk Determinant 304 and supplied the predetermined conditions constituting how to handle a determined public safety risk.

The Alert Module 306 immediately alerts the proper authorities 320 in the presence of a public safety risk, as depicted in step 710.

Subsequent aggregate data collections may be made by the Alert Module 306 in step 720. A particular public safety event may be programmed to result in multiple aggregate location data collections, set to occur at specific intervals. Moreover, a particular risk determination result may be configured to act as a triggered push/pull service 540 to acquire additional location data. Subsequent location information is routinely logged in the Historical Wireless Devices Location Trends and Statistics database 530.

Configurable parameters are maintained in the Risk Rules database 314 to assist the Crowd Risk Determinant 304 in determining if location information pertaining to a viral event indicates a likely public safety risk. Factors for risk determination include but are not limited to the shape a cluster of location markers representing individual wireless devices of given density is forming, whether or not markers are spreading out or coming together, and/or at what rate of change a cluster of wireless devices is moving. Factors for risk determination also include the behavior of collective XY location coordinates of the most dense clusters of wireless devices, to where the most dense clusters of wireless devices of concern are moving, and/or whether or not a cluster of wireless devices in a particular location makes sense given the time of day.

For instance, empirical data may indicate that it is unusual for there to be a large number of wireless devices present downtown after business hours, or after a time when local bars and clubs have closed for the night. In this case, a configurable threshold may be set for a combination of location and time of day parameters (e.g., to articulate the number of wireless devices that must be present within a defined downtown region, after a given hour) to trigger a public safety risk. A configurable parameter threshold (e.g., specifying the number of wireless devices capable of inhabiting a particular geographic expanse or particular shape of device formation, or a given density within that region) may manually or empirically be set. If a parameter threshold is surpassed, the Crowd Risk Determinant 304 informs the Alert Module 306 of the development of a public safety risk.

The shape of a cluster of wireless devices may often offer significant clues to crowd risk potential. When location information is collected, the best-fit shape of dense clusters formed by accumulation of wireless devices in a given area may be determined. The best-fit shape of a cluster of wireless devices may be compared against data contained in the historical Acceptable/Non-Acceptable Crowd Shape database 308 to determine danger potential. Different thresholds may be set for like parameters based on varying location.

Figure 5:
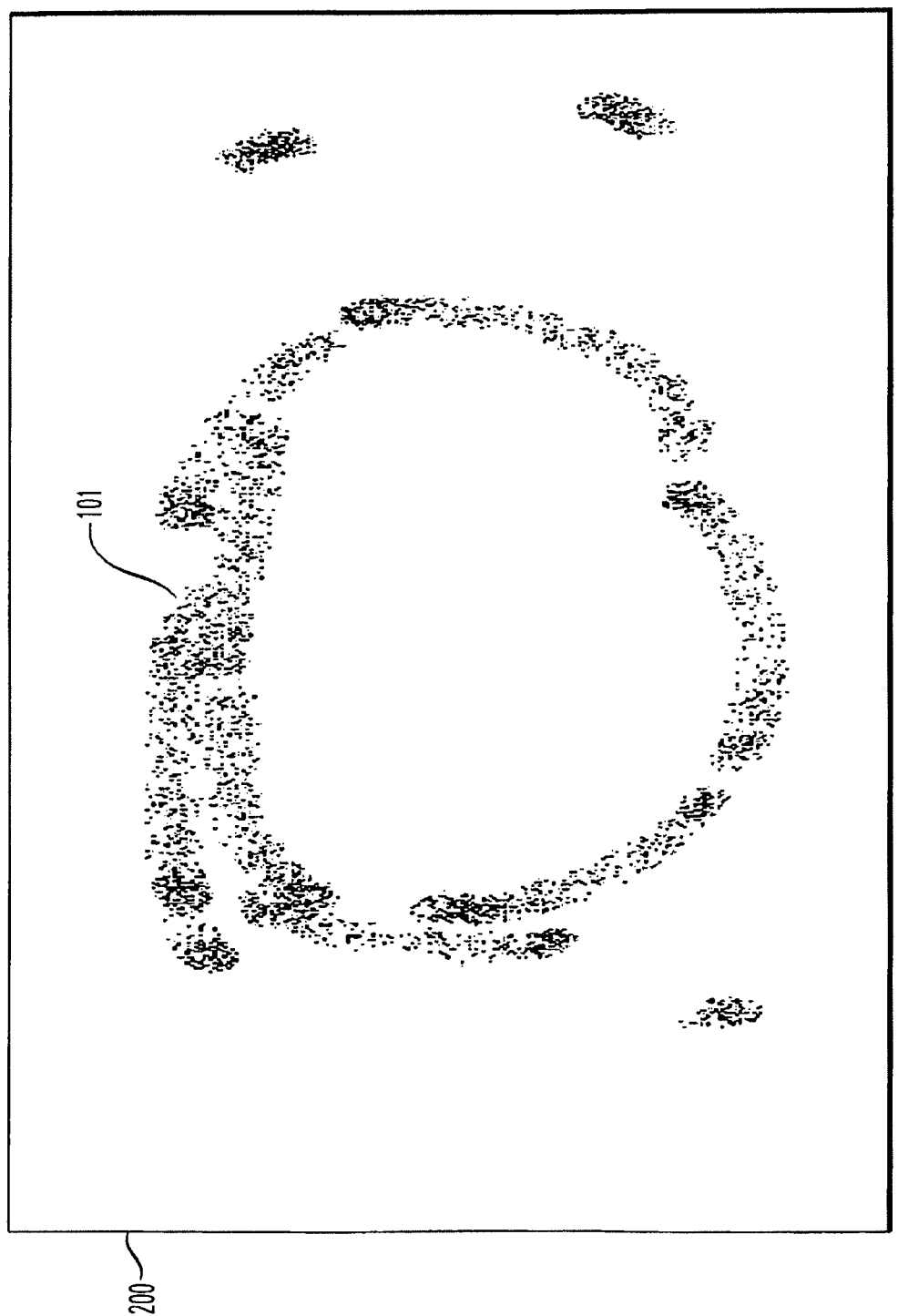
FIG. 5 denotes first exemplary Aggregate Location Dynometer (ALD) location results, in accordance with the principles of the present invention.

FIG. 5 denotes first exemplary Aggregate Location Dynometer (ALD) 400 location results, in accordance with the principles of the present invention.

In particular, the large oval shape 101 formed by markers representing individual wireless devices in the given geographical area 200 shown in FIG. 5, may be interpreted as a group of individuals enjoying a sporting event in a stadium. Factors to consider are time of day and scheduled events. The example in FIG. 5 uses precise location.

Figure 6:
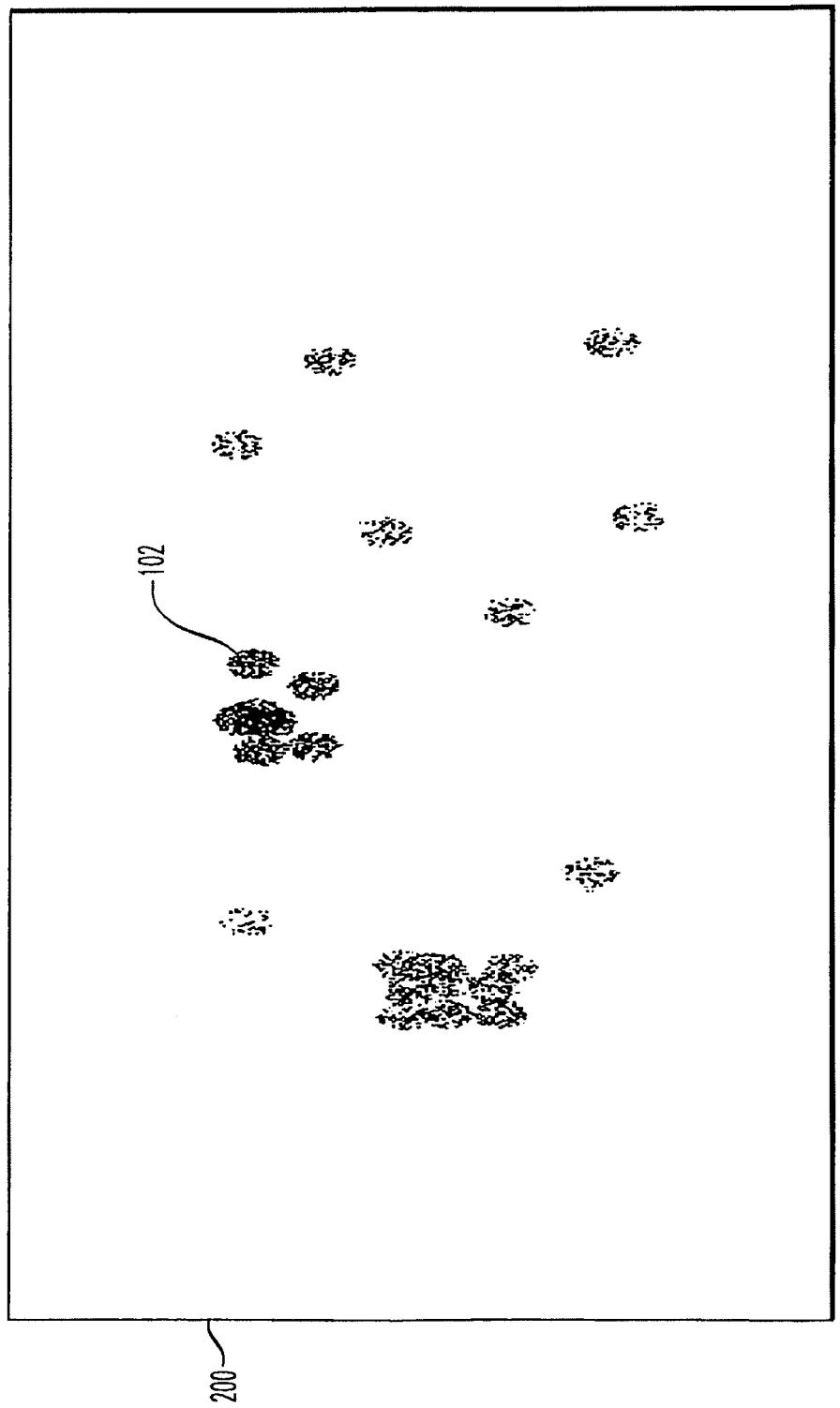
FIG. 6 denotes second exemplary Aggregate Location Dynometer (ALD) location results, in accordance with the principles of the present invention.

FIG. 6 denotes second exemplary Aggregate Location Dynometer (ALD) 400 location results, in accordance with the principles of the present invention.

In particular, the pattern 102 in the geographical area 200 shown in FIG. 6 may be interpreted as cell sites pertaining to trackable individuals, assuming most individuals carry wireless devices. The same pattern may mean different things at different hours of the day. The exemplary location result shown in FIG. 6 uses coarse location.

Figure 7:
FIG. 7 denotes third exemplary Aggregate Location Dynometer (ALD) location results, in accordance with the principles of the present invention.

FIG. 7 denotes third exemplary Aggregate Location Dynometer (ALD) 400 location results, in accordance with the principles of the present invention.

In particular, the crescent shape 103 in the geographical area 200 shown in FIG. 7 is recognized as a pattern to be wary of. This crescent shape may represent a variety of different occurrences (e.g., a protest in front of a given location such as a court house, a famous author at a bookstore, etc.). The exemplary location result shown in FIG. 7 uses precise location.

A rate-based parameter threshold may also or alternatively be set to define an acceptable rate at which wireless devices would otherwise normally inhabit a geographic area. For instance, if over a certain number of wireless devices enter an area in under a given amount of time (e.g., if three hundred wireless devices rush into a central pre-defined location in under ten minutes) then a public safety risk may be triggered.

Message content may be analyzed as an attribute for risk determination in response to a viral traffic event. For instance, a determination of the most frequent phrases may be matched against a database of suspected terms (e.g., "meet at the Lincoln Memorial", etc.).

Motion trends are also analyzed to assess crowd risk. The Crowd Risk Determinant 304 preferably determines whether the accumulation of wireless devices is becoming more or less dense about a central location and whether or not this behavior is expected based on trends and configured thresholds established for particular locations.

Precise accuracy of each individual device location is not extremely important in the present invention. Instead, focus lies in the volume, density, shape and movement of data points collected. Serving cell tower locations for each wireless device may be sufficient to satisfy initial triggering requirements for a possible viral event. The Aggregate Location Dynometer (ALD) 400 is concerned with aggregate location data as opposed to data involving individual device locations. Data regarding parameters such as special events, geographical boundaries, motion trends, density, clustering, spread, time of day and/or message content relating to trackable wireless devices are recorded in the Historical Wireless Device Location Trends and Statistics database 312, as opposed to exact locations of specific wireless devices. Anonymity regarding precise locations of specific wireless devices alleviates some concern surrounding the privacy of individuals during location based services (LBS), as used within the present invention.

An Aggregate Location Dynometer (ALD) 400 has benefit to entities other than emergency management and crowd risk assessment parties. For instance, the present invention may also be used to estimate location trends in cities, to rank areas such as parks and beaches by volume of visitors, and even to peg traffic patterns. Historical crowd data need not represent a public safety issue, e.g., it may merely relate to city planning or disaster recovery. Thus, data collected while scanning for crowd risk provides cities, states and government with valuable information.

Though, preferably all wireless devices in a given area would be monitored for crowd gathering tendencies, it is also within the principles of the present invention to monitor only those devices by the relevant wireless carrier providing Location Dynometer (ALD) 400 services.

The present invention greatly benefits police, fire and general emergency response personnel 320 desiring early warning about possible crowd related risks, e.g., riots. Moreover, the present invention is intended to combat nefarious cell technology to spawn mobs and riots without resorting to network restrictions.

While the invention makes use of the current location data of preferably all wireless devices within a given region, area, etc., the invention also preferably makes distinction between the current mode of operation of the wireless devices being analyzed for a possible public safety risk. For instance, analysis of the density, shape, movement, etc. in determining a possible public safety risk may analyze only wireless devices in active mode.

While the invention has been described with reference to the exemplary embodiments thereof, those skilled in the art will be able to make various modifications to the described embodiments of the invention without departing from the true spirit and scope of the invention.

What is claimed is:

1. An aggregate location dynometer in a physical wireless network server, said aggregate location dynometer comprising:
   a network monitor to monitor a wireless network for an indication of a viral event;
   a location aggregator to obtain a location of each of a plurality of wireless devices associated with said viral event;
   a crowd risk determinant, triggered by said network monitor, to determine a crowd risk based on an aggregation of said location of each of said plurality of wireless devices associated with said viral event; and
   an alert module to initiate an alert message relating to a public safety risk determined from an analysis of said viral event.

2. The aggregate location dynometer in a physical wireless network server, said aggregate location dynometer according to claim 1, further comprising:
   a historical database maintaining a geographic region associated with said viral event.

3. The aggregate location dynometer in a physical wireless network server, said aggregate location dynometer according to claim 2, wherein said historical databases comprises:
   a plurality of acceptable crowd shapes, a crowd shape being defined by said aggregation of said location of each of said plurality of wireless devices associated with said viral event.

4. The aggregate location dynometer in a physical wireless network server, said aggregate location dynometer according to claim 2, wherein said historical databases comprises:
   a plurality of non-acceptable crowd shapes, a crowd shape being defined by said aggregation of said location of each of said plurality of wireless devices associated with said viral event.

5. The aggregate location dynometer in a physical wireless network server, said aggregate location dynometer according to claim 2, wherein said historical databases comprises:
   a configurable parameter defining a threshold of a crowd shape becoming unacceptable and thus said crowd risk.

6. The aggregate location dynometer in a physical wireless network server, said aggregate location dynometer according to claim 2, wherein said historical databases comprises:
   a plurality of crowd shape trends based on historical wireless device locations during previous viral events.

7. A method of alerting to a problematic crowd risk based on location based services (LBS), comprising:
   monitoring wireless traffic for a forming viral event associated with a plurality of physical wireless devices within a given region;
   initiating location requests to a physical location server to obtain a current location of each of said plurality of physical wireless devices;
   forming a crowd shape based on an aggregation of said current location of each of said plurality of physical wireless devices;
   determining a crowd risk of said crowd based on said crowd shape of said current location of each of said plurality of physical wireless devices; and
   triggering a crowd alert message when said determined crowd risk is above a given threshold.

8. The method of alerting to a problematic crowd risk with location based services (LBS) according to claim 7, wherein:
   said crowd risk of said crowd is further determined based on a movement of said crowd shape.

9. The method of alerting to a problematic crowd risk with location based services (LBS) according to claim 7, wherein said monitoring wireless traffic comprises:
   monitoring wireless traffic at a given point in a wireless network; and
   comparing a given traffic parameter associated with said obtained current location of each of said plurality of physical wireless devices, with a historical traffic parameter associated with a previous problematic crowd formation.

10. The method of alerting to a problematic crowd risk with location based services (LBS) according to claim 9, wherein:
    said given point is at a given base station in said wireless network.

11. The method of alerting to a problematic crowd risk with location based services (LBS) according to claim 9, further comprising:
    logging a snapshot formation created by said current location of each of said plurality of physical wireless devices.

12. The method of alerting to a problematic crowd risk with location based services (LBS) according to claim 7, wherein said initiating location requests comprises:
    initiating a location request for each of said plurality of physical wireless devices.

13. The method of alerting to a problematic crowd risk with location based services (LBS) according to claim 7, further comprising:
    comparing a viral pattern of respective locations of said plurality of wireless devices to predetermined risk rules.

14. The method of alerting to a problematic crowd risk with location based services (LBS) according to claim 13, further comprising:
    logging said viral pattern.

* * * * *